(12) United States Patent
Turner et al.

(10) Patent No.: US 11,141,911 B2
(45) Date of Patent: Oct. 12, 2021

(54) HIGH PRODUCTIVITY THREE-DIMENSIONAL PRINTER

(71) Applicant: 3D Systems, Inc., Rock Hill, SC (US)

(72) Inventors: Peter Scott Turner, Venice, CA (US); David Sabo, San Diego, CA (US)

(73) Assignee: 3D Systems, Inc., Rock Hill, SC (US)

( * ) Notice: Subject to any disclaimer, the term of this patent is extended or adjusted under 35 U.S.C. 154(b) by 216 days.

(21) Appl. No.: 16/525,819

(22) Filed: Jul. 30, 2019

(65) Prior Publication Data

US 2020/0039143 A1 Feb. 6, 2020

Related U.S. Application Data

(60) Provisional application No. 62/714,119, filed on Aug. 3, 2018.

(51) Int. Cl.

| | |
|---|---|
| *B29C 64/135* | (2017.01) |
| *B29C 64/277* | (2017.01) |
| *B29C 64/255* | (2017.01) |
| *B29C 64/245* | (2017.01) |
| *B29C 64/232* | (2017.01) |
| *B29C 64/236* | (2017.01) |

(Continued)

(52) U.S. Cl.
CPC .......... *B29C 64/135* (2017.08); *B29C 64/232* (2017.08); *B29C 64/236* (2017.08); *B29C 64/245* (2017.08); *B29C 64/255* (2017.08); *B29C 64/277* (2017.08); *B33Y 10/00* (2014.12); *B33Y 30/00* (2014.12)

(58) Field of Classification Search
CPC ... B29C 64/106; B29C 64/124; B29C 64/129; B29C 64/135
See application file for complete search history.

(56) References Cited

U.S. PATENT DOCUMENTS

| | | | |
|---|---|---|---|
| 5,009,585 A * | 4/1991 | Hirano | B29C 64/135 425/174.4 |
| 8,678,805 B2 * | 3/2014 | Vermeer | B33Y 30/00 425/174.4 |

(Continued)

FOREIGN PATENT DOCUMENTS

| | | | | |
|---|---|---|---|---|
| DE | 102012011610 A1 * | 11/2012 | | B29C 64/129 |

OTHER PUBLICATIONS

PCT International Search Report for International Search Authority for PCT/US2019/044041, dated Oct. 2, 250196 pages).

(Continued)

*Primary Examiner* — Atul P. Khare

(57) ABSTRACT

A system for manufacturing a three-dimensional article includes a resin vessel, a vertical movement mechanism, and a light engine. The resin vessel includes a lower opening closed by a transparent sheet. The vertical movement mechanism is for positioning a support tray which supports the three-dimensional article. The light engine is disposed below the transparent sheet and is configured to selectively harden layers of resin over a build plane above the transparent sheet. The light engine includes a light bar coupled to a lateral movement mechanism. The light bar includes an array of light emitting devices and a device for impinging upon the transparent sheet. The impingement maintains a proper operating distance H between the transparent sheet and the build plane.

20 Claims, 3 Drawing Sheets

(51) Int. Cl.
  *B33Y 80/00*      (2015.01)
  *B33Y 30/00*      (2015.01)
  *B33Y 10/00*      (2015.01)

(56) References Cited

U.S. PATENT DOCUMENTS

| | | | |
|---|---|---|---|
| 8,777,602 B2* | 7/2014 | Vermeer | B29C 64/124 |
| | | | 425/375 |
| 8,877,115 B2* | 11/2014 | Elsey | B29C 64/393 |
| | | | 264/401 |
| 8,905,739 B2* | 12/2014 | Vermeer | B29C 64/129 |
| | | | 425/115 |
| 9,375,881 B2* | 6/2016 | Elsey | B29C 35/0888 |
| 10,201,963 B2* | 2/2019 | Thomas | B29C 64/379 |
| 10,675,856 B2* | 6/2020 | FrantzDale | B29C 64/255 |
| 10,882,247 B2* | 1/2021 | Esbroeck | B29C 64/129 |
| 11,059,219 B2* | 7/2021 | Childers | B29C 64/379 |
| 2015/0001763 A1 | 1/2015 | Elsey | |
| 2015/0246486 A1 | 9/2015 | El-Siblani et al. | |
| 2018/0004192 A1 | 1/2018 | Perret et al. | |
| 2019/0366631 A1* | 12/2019 | Michalica | B29C 64/277 |
| 2019/0369566 A1* | 12/2019 | Lobovsky | G01L 1/127 |

OTHER PUBLICATIONS

PCT Written Opinion for International Search Authority for PCT/US2019/044041, dated Oct. 25, 2019 (7 pages).

* cited by examiner

HIGH PRODUCTIVITY THREE-DIMENSIONAL PRINTER

FIELD OF THE INVENTION

This non-provisional patent application claims priority to U.S. Provisional Application Ser. No. 62/714,119, Entitled "HIGH PRODUCTIVITY THREE-DIMENSIONAL PRINTER" by Peter Scott Turner et al., filed on Aug. 3, 2018, incorporated herein by reference under the benefit of U.S.C. 119(e).

FIELD OF THE INVENTION

The present disclosure concerns an apparatus and method for fabrication of solid three-dimensional (3D) articles of manufacture from energy curable materials. More particularly, the present disclosure concerns a very high performance three-dimensional printer.

BACKGROUND

Three-dimensional printers are in wide use for manufacturing three-dimensional articles. Some three-dimensional printer designs are optimized for the use of photocurable materials. Typically these printers have been used for low volume applications such as prototyping. There is an increasing desire to utilize three-dimensional printers for manufacturing.

SUMMARY

Figure 1:
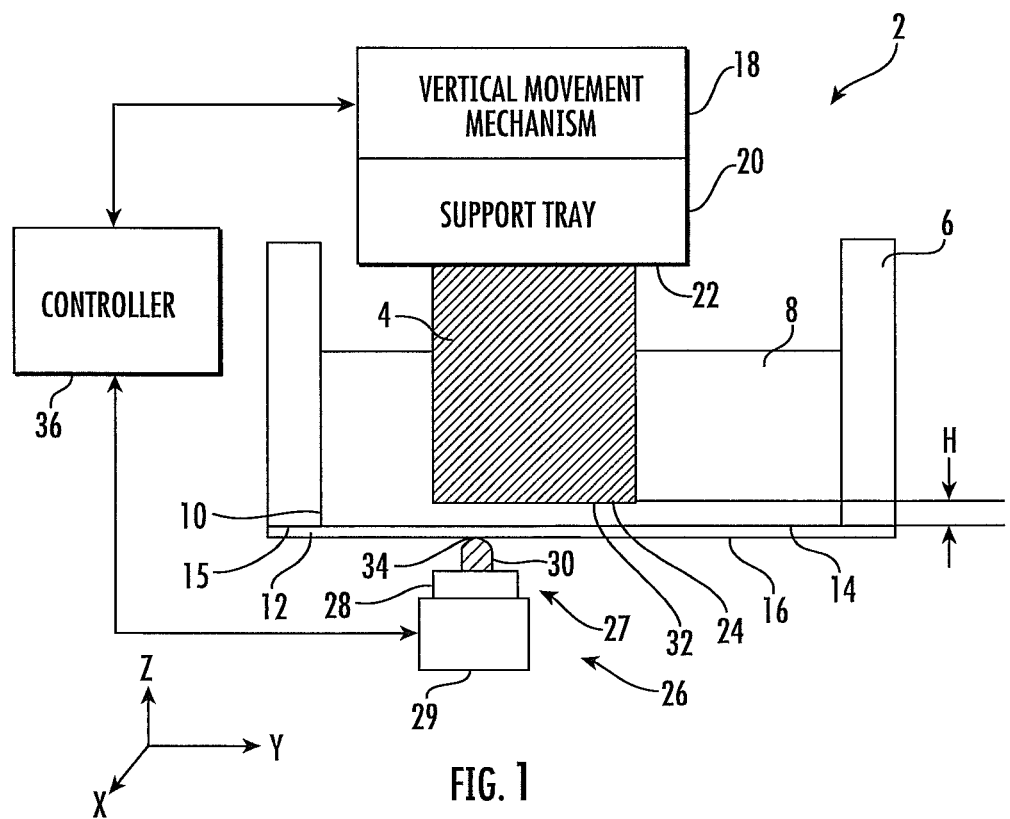
FIG. 1 is a schematic block diagram of an embodiment of a three-dimensional printing system for manufacturing a three-dimensional article.

In a first aspect of the disclosure, a system for manufacturing a three-dimensional article includes a resin vessel, a vertical movement mechanism, and a light engine. The resin vessel includes a lower opening closed by a transparent sheet having opposed upper and lower surfaces. The upper surface of the transparent sheet is for contacting resin contained in the resin vessel. The vertical movement mechanism is for positioning a support tray. The support tray has a lower surface for supporting the three-dimensional article. A lower face is defined by the lower surface of the support tray or a lower end of the three-dimensional article. The light engine is disposed below the transparent sheet and is configured to selectively harden layers of resin over a build plane above the transparent sheet. The light engine includes a light bar coupled to a lateral movement mechanism. The light bar includes an array of individually controllable light emitting devices arranged along a first lateral axis. The light bar includes a device for impinging upon the lower surface of the transparent sheet to provide a proper operating distance H between the transparent sheet and the build plane. The lateral movement mechanism is configured to scan the light bar along a second lateral axis to allow the light bar to address the entire build plane. The light emitting devices can include diode lasers, light emitting diodes (LED's), and/or vertical cavity surface emitting lasers (VCSEL's).

In one implementation the light bar includes a light guide for directing light from the light emitting devices toward the build plane. The light guide is the device for impinging upon the lower surface of the transparent sheet and thus provides a dual function of directing light and maintaining the proper distance H.

In another implementation the device for impinging includes two rollers. The array of light emitting devices can transmit light upwardly and between the two rollers.

In a further implementation the upper surface of the transparent sheet is supported by a rim at a distance D above the build plane. D is greater than H. D can be more than 1.5 times H. D can be more than 2 times H. D can be more than 3 times H. D can be more than 5 times H. D can be more than 10 times H.

In a yet further implementation the system includes a controller that is controllably coupled to the vertical movement mechanism and the light engine. The controller is configured to (a) operate the vertical movement mechanism to position the lower face proximate to the build plane, (b) operate the lateral movement mechanism to scan the light bar along the second lateral axis, (c) concurrent with scanning the light bar, operate the plurality of light emitting devices to selectively harden resin across the build plane, and (d) repeat operating the vertical movement mechanism, the lateral movement mechanism, and the plurality of light emitting devices to complete fabrication of the three-dimensional article.

DETAILED DESCRIPTION OF THE PREFERRED EMBODIMENTS

FIG. 1 is a schematic block diagram of an embodiment of a three-dimensional printing system 2 for manufacturing a three-dimensional article 4. In describing the following figures, mutually perpendicular axes X, Y, and Z will be used. Axes X and Y are lateral axes that are horizontal or nearly horizontal. Axis Z is a vertical axis that is generally aligned with a gravitational reference. The direction+Z is generally upward and the direction −Z is generally downward.

The three dimensional printing system 2 includes a resin vessel 6 for containing a photocurable resin 8 including a lower opening 10 closed by a transparent sheet 12. The transparent sheet 12 has an upper surface 14 and an opposing lower surface 16. The upper surface 14 of the transparent sheet 12 is in contact with the resin 8. The upper surface 14 is supported around edges of the opening 10 by a rim 15.

A vertical movement mechanism 18 is configured to support and vertically translate a support tray 20. The support tray 20 has a lower surface 22 that supports the three-dimensional article 4. The three-dimensional article 4 has a lower face 24 which is in facing relation with the upper surface 14 of the transparent sheet 12.

A light engine 26 is disposed below the resin vessel. The light engine 26 includes a light bar 27 and a lateral movement mechanism 29. The light bar 27 includes an array 28 of individually controllable light emitting devices and a light pipe 30. The array 28 of light emitters can be diode lasers, light emitting diodes (LED's) or vertical cavity surface emitting lasers (VCSEL's) and/or other individually controllable light emitters. The light guide is positioned above the array 28 and directs light from the array 28 toward a build plane 32. The light guide 30 also has an upper surface 34 that impinges upon the lower surface 16 of the transparent sheet 12. This impingement helps to maintain a proper spacing or operating distance H between the upper surface 14 of the transparent sheet 12 and the lower face 24. Thus, in the illustrated embodiment, the light guide 30 has a dual function of mechanically maintaining the spacing H and for directing light from the array 28.

In an alternative embodiment, a device for impinging upon the lower surface 16 can be separate from the light guide 30. In another alternative embodiment, the light bar 27 includes a combination of one or more lasers and scanning optics for scanning the beams emitted by the laser(s) across the build plane.

Figure 2:
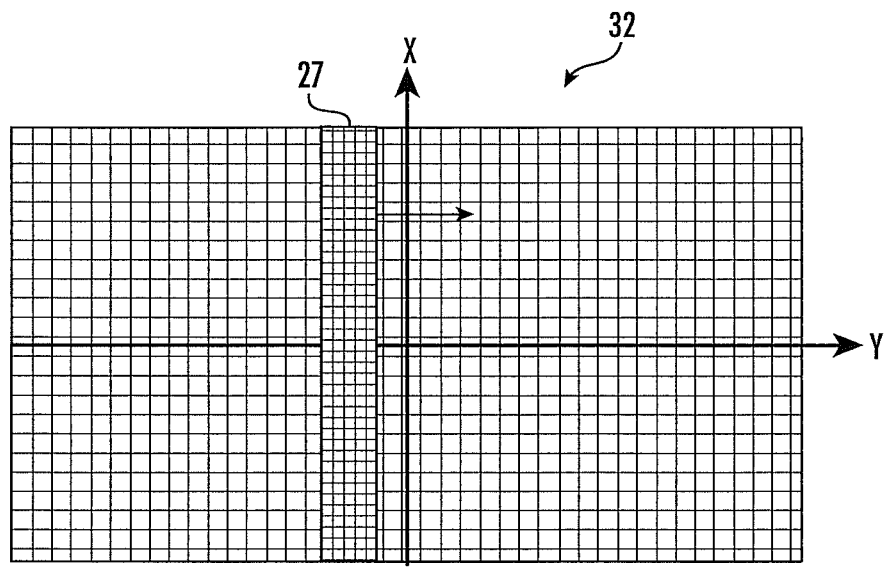
FIG. 2 is a diagram of an overlay between a build plane and a light bar.

The lateral movement mechanism 29 is configured to scan the light bar 27 along lateral axis Y, so that the entire build plane 32 can be addressed by the light engine 26. Build plane 32 is further illustrated in FIG. 2. The light bar 27 extends along the lateral X-axis of the build plane 32 and scans along the lateral Y-axis. As the light bar 27 scans, individual light emitting devices of the array 28 are activated to selectively harden layers of resin over the build plane and accretively onto the lower face 24.

A controller 36 is controllably coupled to the vertical movement mechanism 18, the light bar 27, and the lateral movement mechanism 29. The controller is configured to (a) operate the vertical movement mechanism 18 to position the lower face 24 proximate to the build plane 32, (b) operate the lateral movement mechanism 29 to scan the light bar 27, (c) concurrent with scanning the light bar, operate the array 28 to selectively harden the resin across the build plane, and (d) repeat (a)-(c) to complete fabrication of the three-dimensional article 4.

The controller 36 includes a processor coupled to an information storage device. The information storage device includes a non-volatile or non-transient storage device storing software instructions. The software instructions, when expected by the processor, operate various portions of system 2 including the vertical movement mechanism 18, the light bar 27, and the lateral movement mechanism 29.

Figure 3:
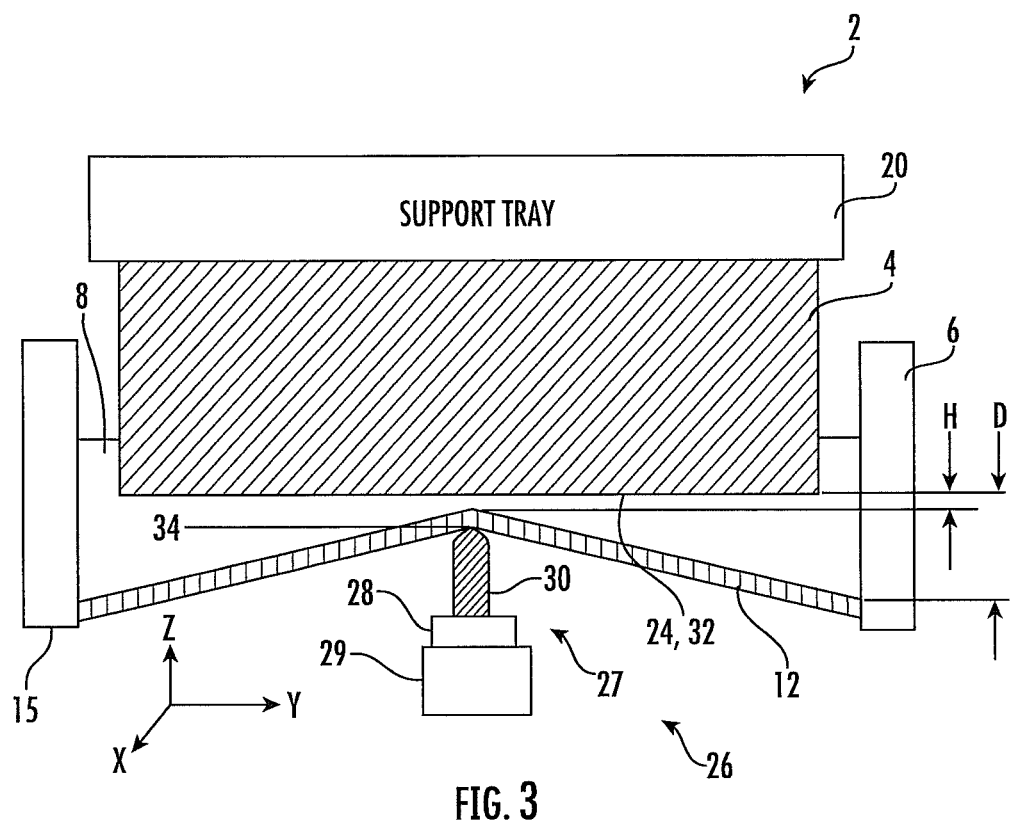
FIG. 3 is a schematic of a portion of a three-dimensional printing system.

FIG. 3 depicts a portion of the three-dimensional printing system 2 with an exaggerated emphasis on the effect of the light bar 27 on the transparent sheet 12. The transparent sheet 12 is supported around the rim 15. Without the impingement of surface 34 on transparent sheet 12, the transparent sheet 12 would be a distance D from build plane 32 (or lower face 24). The upper surface 34 of light bar 27 pushes the transparent sheet 12 to an operating distance H from the build plane 32. At this distance H, polymerization of resin can accrete onto the lower face 24.

As the light bar 27 scans along Y, it forms a ridge in the transparent sheet as it scans. This motion has two beneficial effects. First, it helps to replenish uncured resin along the build plane 32. Second, this can provide a peeling force to assure that the film 12 does not stick to the lower face 24. In the illustrated embodiment, surface 34 is formed by light guide 30.

Figure 4:
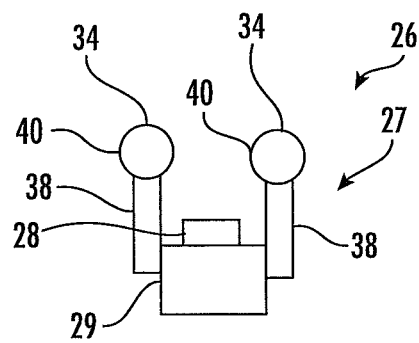
FIG. 4 is an alternative embodiment of a light engine.

An alternative embodiment of the light engine 26 is illustrated in FIG. 4. In this illustrated embodiment, a device 38 for impinging upon the lower surface of the transparent sheet 12 does not function as a light guide 30. In the illustrated embodiment there are two such devices 38. The devices 38 include rollers 40 for impinging upon the transparent sheet 12 to maintain the proper operating distance H. The array 28 of light emitters project light upwardly between the rollers 38 and to the build plane 32. In one embodiment, the array 28 of light emitters includes VCSEL's.

Figure 5:
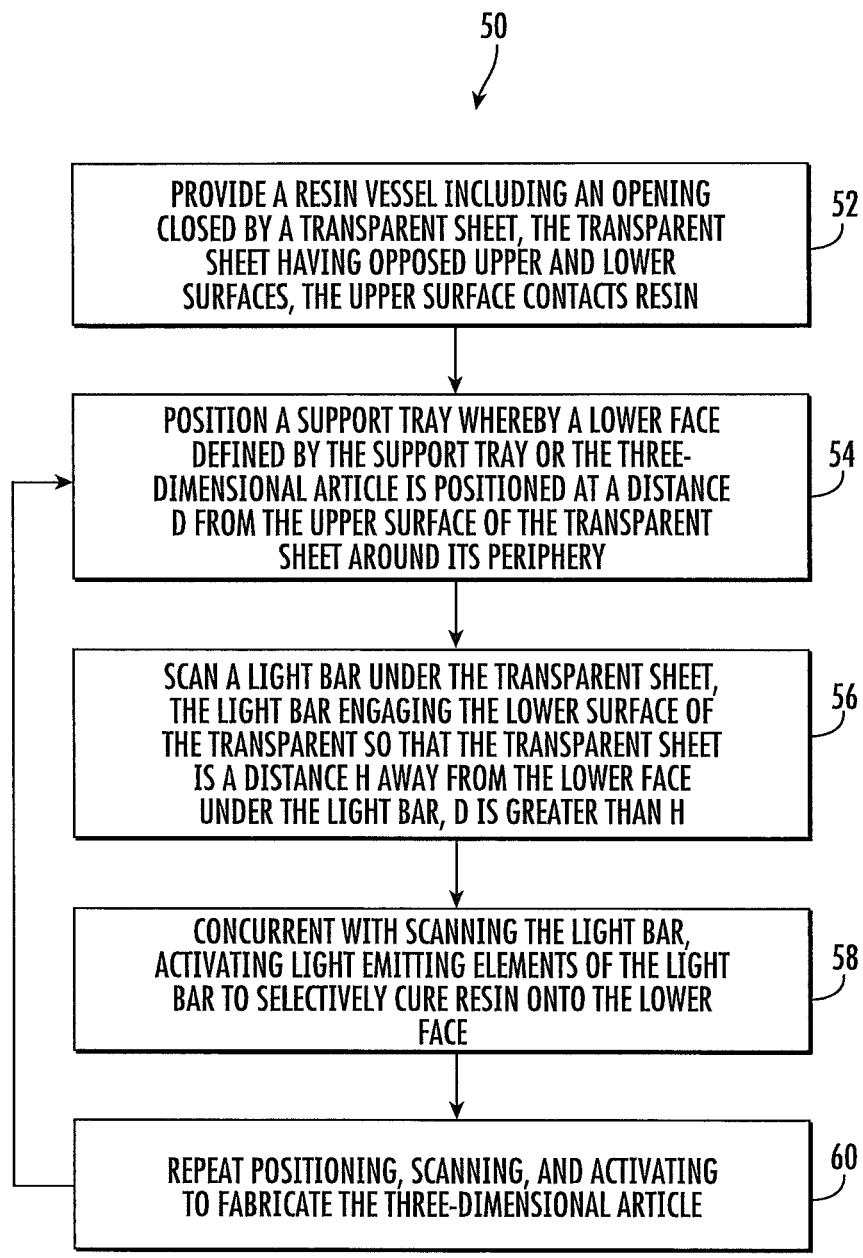
FIG. 5 is a flowchart depicting an embodiment of a method for manufacturing a three-dimensional article.

FIG. 5 is a flowchart depicting a method 50 for manufacturing a three-dimensional article 4 using a three-dimensional printing system 2. Method 50 is performed by controller 36.

According to 52, a resin vessel 6 is provided or loaded into the three-dimensional printing system 2. The resin vessel 6 defines an opening 10 that is closed on a lower side by a transparent sheet 12. The transparent sheet 12 has opposed upper 14 and lower 16 surfaces. Resin 8 is poured or provided in the resin vessel 6, and contacts the upper surface 14 of the transparent sheet 12. The transparent sheet 12 is supported around a rim 15.

According to 54, a support tray 20 is positioned whereby a lower face 24 (initially the lower surface 22 of the support tray 20 but later a lower face 24 of the three-dimensional article 4) is positioned proximate to a build plane 32 and at a distance D from the upper surface 14 of the transparent sheet proximate to the rim 15.

According to 56, a light bar 27 is scanned under the transparent sheet 12. The light bar 27 includes an array 28 of light emitting devices arranged along a first axis X. The scan direction is along a second lateral axis Y. The light bar 27 defines an upper surface 34 that impinges upon the lower surface 16 of the transparent sheet 12, pushing the upper surface 14 to a distance H from the lower face 24 underneath the array 28 of light emitting devices. The distance D is greater than H.

According to 58—concurrent with scanning the light bar 27, the array 28 of light emitting devices is activated to selectively harden a layer of resin onto the lower face 24. According to 60, positioning, scanning, and activating are repeated until the three-dimensional article 4 is fabricated.

For method 50, variations are possible. The light bar 27 embodiment discussed with respect to FIG. 3 or FIG. 4 can be used. According to the embodiment of FIG. 3, a light guide 30 provides the upper surface 34 that contacts the lower surface 16 of the transparent sheet. According to the embodiment of FIG. 4, a device 38 provides the upper surface 34 that contacts the lower surface 16 of the transparent sheet Other embodiments are also possible with other light bar 27 designs.

The specific embodiments and applications thereof described above are for illustrative purposes only and do not preclude modifications and variations encompassed by the scope of the following claims.

What is claimed:

1. A system for manufacturing a three-dimensional article, the system comprising:
    a resin vessel including a lower opening closed by a transparent sheet, the transparent sheet having opposed upper and lower surfaces, with the upper surface being for contacting resin contained in the resin vessel and being supported by a rim of the resin vessel around edges of the opening at a distance D from a build plane disposed above the transparent sheet;
    a vertical movement mechanism for positioning a support tray having a lower surface for supporting the three-dimensional article being manufactured, the support tray or the three-dimensional article being manufactured defining a lower face disposed within the resin and facing the upper surface of the transparent sheet;
    a light engine disposed below the transparent sheet and configured to selectively harden layers of the resin across the build plane above so as to form the three-dimensional article, the light engine including:
        a light bar including at least one light emitting device arranged along a first lateral axis, the light bar including a light guide providing a dual function of directing light from the at least one light emitting device to the build plane while impinging upon the lower surface of the transparent sheet to maintain a proper operating distance H between the upper surface of the transparent sheet and the build plane, with the distance D being at least 1.5 times the proper operating distance H; and a lateral movement mechanism configured to scan the light bar along a second lateral axis so as to allow the light bar to address the entire build plane and cause the light guide to push the transparent sheet from the distance D to the proper operating distance H across the build plane where the light bar is addressing the build plane.

2. The system of claim 1 wherein the at least one light emitting device includes a plurality of light emitting devices arranged along the first lateral axis.

3. The system of claim 2 wherein the light emitting devices are vertical cavity surface emitting lasers (VCSEL).

4. The system of claim 2 wherein the light emitting devices are light emitting diodes.

5. The system of claim 2 further comprising a controller configured to control the vertical movement mechanism, the light emitting devices, and the lateral movement mechanism.

6. The system of claim 1 wherein the light guide comprises a rounded upper surface for contacting the lower surface of the transparent sheet.

7. The system of claim 5 wherein the light guide forms a ridge in the transparent sheet extending from the distance D to the proper operating distance H during said scanning.

8. The system of claim 1 wherein the light guide includes a plurality of micro-lenses.

9. The system of claim 1 further comprising a controller configured to:
operate the vertical movement mechanism to position the lower face proximate to the build plane;
operate the lateral movement mechanism to scan the light bar along the second lateral axis;
concurrent with scanning the light bar, operate the at least one light emitting device to selectively harden the resin across the build plane; and
repeat operating the vertical movement mechanism, the lateral movement mechanism, and the at least one light emitting device to complete fabrication of the three-dimensional article.

10. The system of claim 9 wherein the light guide comprises a rounded upper surface for contacting the lower surface of the transparent sheet.

11. The system of claim 9 wherein the light guide forms a ridge in the transparent sheet extending from the distance D to the proper operating distance H during said scanning.

12. The system of claim 1 wherein the distance D is at least 2 times the proper operating distance H.

13. The system of claim 1 wherein the distance D is at least 3 times the proper operating distance H.

14. The system of claim 1 wherein the distance D is at least 5 times the proper operating distance H.

15. The system of claim 1 wherein the distance D is at least 10 times the proper operating distance H.

16. A method of manufacturing a three-dimensional article using the system of claim 1, the method comprising:
operating the vertical movement mechanism to position the lower face proximate to the build plane;
operating the lateral movement mechanism to scan the light bar underneath the transparent sheet, thereby pressing the upper surface of the transparent sheet from the distance D to the proper operating distance H;
concurrently with scanning the light bar, activating the at least one light emitting device to selectively cure a layer of the resin onto the lower face; and
repeating operating the vertical movement mechanism, operating the lateral movement mechanism, and activating the at least one light emitting device to complete fabrication of the three-dimensional article.

17. The method of claim 16 wherein the distance D is at least 2 times the proper operating distance H.

18. The method of claim 16 wherein the distance D is at least 3 times the proper operating distance H.

19. The method of claim 16 wherein the distance D is at least 5 times the proper operating distance H.

20. The method of claim 16 wherein the distance D is at least 10 times the proper operating distance H.

* * * * *